Feb. 28, 1939.  L. FRÄNKEL  2,148,934
CINEMATOGRAPHIC CAMERA
Filed Nov. 7, 1935   2 Sheets-Sheet 1
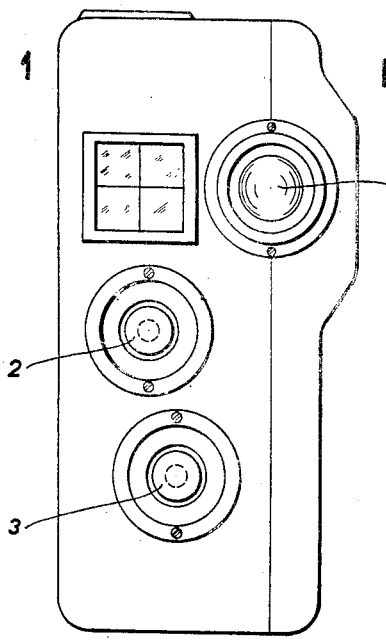
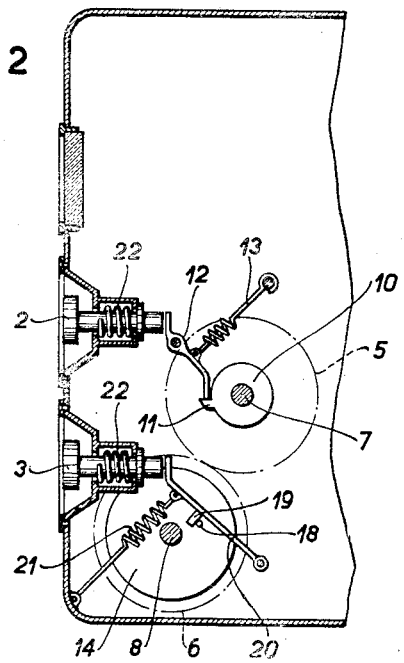
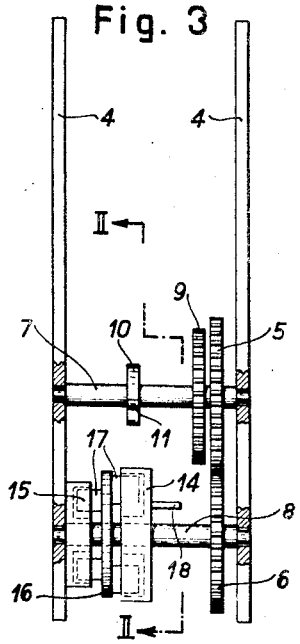
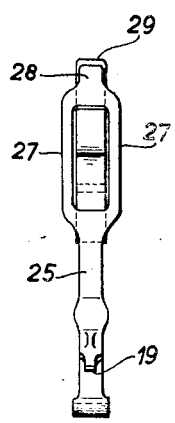
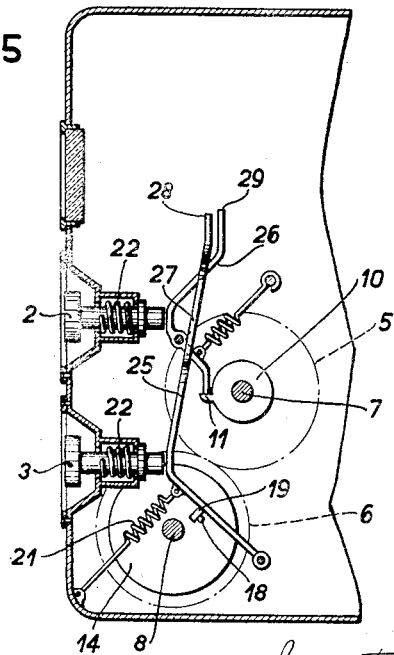
Inventor
Leo Fränkel,
By Sommers & Young Attys.

Feb. 28, 1939.  L. FRÄNKEL  2,148,934
CINEMATOGRAPHIC CAMERA
Filed Nov. 7, 1935   2 Sheets-Sheet 2
Fig. 4
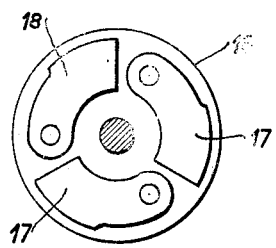
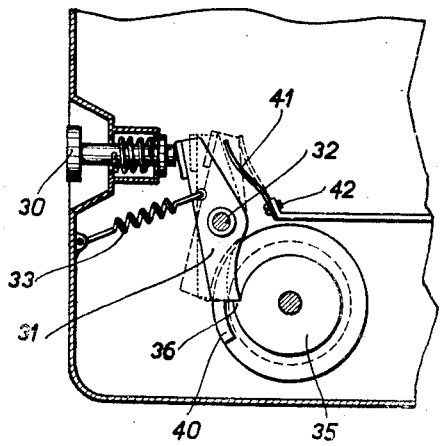
Fig. 7
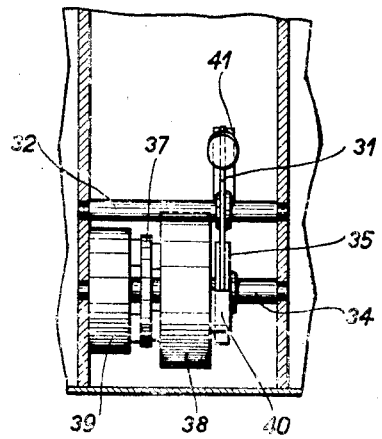
Fig. 8
Inventor
Leo Fränkel
By Sommers & Young
Attys.

Patented Feb. 28, 1939

2,148,934

UNITED STATES PATENT OFFICE 2,148,934

CINEMATOGRAPHIC CAMERA

Leo Fränkel, Vienna, Austria, assignor to Lampen-und Metallwaren-fabrieken R. Ditmar Gebruder Brunner A. G., Vienna, Austria, a company of Austria Application November 7, 1935, Serial No. 48,745
In Austria November 16, 1934

3 Claims. (Cl. 88—18)

This invention relates to a cinematographic camera, particularly of the type to be held by the operator during use, and in which the film feeding mechanism is actuated mechanically, as for example by a clockwork or by an electric motor at two or more speeds to be selected by the operator.

An object of the present invention is to provide a speed control mechanism simple, light and inexpensive in construction and having a high reliability in operation. A further object of the invention is to provide a speed control mechanism for obtaining two or more accurately timed speeds by actuating the hand operated control means in an easy and handy manner. Another object of the invention is to provide a speed control mechanism which avoids the usual shiftable gears in order to simplify the construction and to avoid friction of the mechanism and, therefore, to reduce consumption of power as much as possible. Other objects will appear hereinafter from the following specification.

Several embodiments of the present invention are illustrated by way of example in the accompanying drawings in which:

Fig. 1 is a front view of the camera,

Fig. 2 is a section according to line II—II of Fig. 3, showing the actuating mechanism, Fig. 3 is a front view of the braking device shown in Fig. 2, Fig. 4 shows a detail on an enlarged scale, Fig. 5 is a section similar to Fig. 2 showing a modification of the invention, Fig. 6 is a front view of a detail of the mechanism shown in Fig. 5, Figs. 7 and 8 show a further modification of the invention in side view and front view respectively.

As shown in Figs. 1 to 4, two push-buttons 2 and 3 are arranged in the front wall of the camera below the lens 1 in such a way that each may be easily actuated by another finger of the hand holding the camera, without the necessity of removing the hand from its holding position. The upper button 2 serves to start the camera at the normal speed (for instance 16 pictures per second), whereas the lower button 3 serves to make operative the high or ultra-speed (for instance 32 pictures or more per second). Obviously a third button likewise operable by a finger may be provided to select a third speed, for instance a low speed (8 pictures per second). When the button 2 is depressed the camera is started and works at normal speed. When the button 3 is depressed the speed is increased to the high speed, for instance to twice the normal speed, without interruption of the operation. The arrangement may be such that for maintaining the high speed it is necessary to depress both, the button 2 and the button 3.

This is of advantage in that during the operation at high speed, during which the mechanism has a certain tendency to impart vibrations to the camera, the force of two fingers is exerted so that the camera is held more steadily and firmly by the hand.

In Figs. 2 to 4 a preferred form of the actuating and braking mechanism is illustrated. In the supporting members 4 are journalled two shafts 7 and 8 which are operatively connected with one another by means of a pair of gear wheels 5 and 6, secured to the shafts respectively. The shaft 7 is actuated by means of a gear wheel 9 in any desired manner as by a clockwork or spring motor (not illustrated) and carries a locking wheel 10 having a tooth 11 against which the end of a lever 12 operated by the push-button 2 is caused to strike under the effect of a coiled spring 13. On a shaft 8 a larger braking drum 14 and a smaller braking drum 15 are loosely mounted. The latter is stationary, being fixedly secured to the adjacent support 4. A disk 16 is secured on the shaft 8 between the drums 14 and 15 and on each side of this disk a series of three braking shoes 17 (Fig. 4) are pivoted which project into the hollow drums 14 and 15 and are pressed against the inner side of their periphery by centrifugal force against the action of return springs (not illustrated). Thus the braking means for the driving mechanism are arranged so as to operate stepwise the steps corresponding to the interaction between the drums 14 and 15 and the braking shoes 17. On the drum 14 a pin 18 is secured cooperating with a projection 19 on a lever 20. This lever is operated by the spring 21 and by the push-button 3. The connection of the shafts 7 and 8 with the film feeding mechanism and the arrangement of the latter may be of any approved or desired type and is not illustrated as not being essential for the present invention.

The operation of the device is as follows:

The shaft 7 is driven by a spring motor or the like so as to rotate in the direction of the arrow in Fig. 2. This figure shows the device at rest, the whole mechanism being arrested by the lever 12 bearing against the locking tooth 11. When the button 2 is depressed against the effect of the springs 13 and 22, the lever is disengaged from the locking wheel 11 so that the mechanism is started by the motor. The brake-shoes 17 exert a braking effect in the larger drum 14 since this drum is held against rotation by the projection 19 of the lever 20. When the button 3 is now depressed, the projection 19 is disengaged from the pin 18 so that the drum 14 is released and is engaged for rotation by the rotating braking shoes 17. The braking action of the drum 14 therefore ceases whilst the braking or regulating effect of the small drum 15 comes into operation. Since the braking effect of the drum 15 is operative only at a higher speed owing to the difference of diameter, the mechanism will now run faster than formerly. By suitably choosing the diameter of the drums and the distance of the pivots, the brake-shoes and the return springs a suitable running speed is obtained so that the device runs for instance at double speed or at thrice the speed it ran originally when the drum 14 was operative. It is to be seen that when the device runs at high speed the button 2 must also be held in its depressed position, since otherwise the mechanism would be arrested by the lever 12 bearing against the tooth 11. This high speed running requires exertion in two fingers while low speed will only require the holding of one button.

In the modification shown in Figs. 5 and 6 the arrangement and the operation of the mechanism is substantially the same as in the foregoing example. The levers 12 and 20 shown in Fig. 2 are, however, shaped in a modified manner. As shown in Figs. 5 and 6 the levers 25 and 26 extend upwardly and the lever 25 has a slotted part 27 through which the front portion of the lever 26 is allowed to pass, the upper end 28 of the lever 25 being located in front of the upper end 29 of the lever 26.

In order to start the mechanism at the high or ultra speed it is merely necessary to depress the lower button 3, the end 28 of the lever 25 engaging the end 29 of the lever 26, so that both, the locking tooth 11 and the pin 18, are released at the same time without actuating the button 2. It will, therefore, be seen that in this arrangement both push-buttons 2 and 3 may be operated independently of each other.

In the modification of the invention shown in Figs. 7 and 8 a single actuating member is provided which, in accordance with the extent to which it is moved acts to start the mechanism at either of both speeds respectively. This member consists of a push-button 30 actuating a lever 31 pivotally mounted on the axis 32 and being under the influence of a coiled spring 33. On the shaft 34, actuated by the driving motor in any desired manner, is fixedly secured a locking wheel 35 having a locking tooth 36, and a support member 37 carrying at its opposite sides two series of brake shoes. A large brake drum 38 and a small brake drum 39 are loosely mounted on the shaft 34. The brake shoes extend into and cooperate with the drums in a manner similar to that shown in the embodiment illustrated in Figs. 1 to 4. The drum 39 is fixedly secured to the wall 4, whereas the drum 38 has a claw-shaped projection 40 axially extending into the middle plane of the lever 31 and of the locking wheel 35. A flat spring 41 secured at 42 to a stationary part serves as a resilient stop for the lever 31.

When the camera is not in use the lever 31 assumes the position shown in full lines (Fig. 7), the lower end of the lever bearing against the locking tooth 36 of the wheel 35 so that the shaft 34 and the whole mechanism is arrested. When the push-button 30 is depressed so far that the resistance exerted by the spring 41 is perceived, the position shown in dotted lines is reached.

In this position the lever 31 has been disengaged from the locking tooth 36 so that the mechanism is started, the speed which may be the usual speed, being determined by the cooperation of the brake shoes with the larger brake drum 38, which is still held against rotation by the lever 31. When the push-button 30 is, however, further depressed against the force exerted by the spring 41 until the lever 31 assumes the position shown in dashed lines, the projection 40 of the drum 38 is released so that the latter is engaged by the brake shoes and rotates with the speed imparted to them. Now, only the braking action of the small drum 39 is operative so that the mechanism rotates with the desired high or ultra-speed.

It will be seen that if three different speeds, for instance a normal speed, a high speed and a low speed, are provided, three braking steps having different brake effects may be employed, the arrangement being such that at the low, normal and high speed the large, middle and small brake steps are operative respectively.

What I claim, is:

1. In a cinematographic camera adapted to be mechanically driven selectively at two or more speeds, a speed control mechanism comprising starting means, braking means to regulate the speed, said braking means comprising at least two brakes having different braking effects, at least one of said brakes comprising two cooperating frictional elements mounted to rotate together, means for locking one of said frictional elements against rotation to apply a braking effect, and hand operated control means for said locking means.

2. In a cinematographic camera adapted to be mechanically driven selectively at two or more speeds, a speed control mechanism comprising starting means, a power-driven shaft, two frictional members rotatably mounted on said shaft, a support member secured on said shaft between said frictional members and carrying frictional elements cooperating with said members, means to lock at least one of said frictional members against rotation, and hand operated control means acting on said locking means.

3. In apparatus for controlling the speed of operation of multiple speed cinematographic cameras; a casing; an element connected with the camera operating means to be synchronously driven thereby; two speed controlled brakes for retarding the speed of operation of the camera, said brakes having different critical speeds of braking; means for connecting each of said brakes with said element; stopping and starting means for locking said element and thus the camera operating means against movement, and for releasing said element for operation under the retarding effect of one of said brakes; brake control means for selectively engaging and releasing said one of said brakes; whereby, when released, the element connected to the camera operating means is operated under the restraint of one or the other of said brakes at different speeds; the stopping and starting means including a push button located on the outside of the casing in position to be engaged by a finger of the operator, the brake control means also including a push button on the outside of the casing for operation by a finger, said push buttons being located closely adjacent each other so as to be engageable and operable at the same time by different fingers of the same hand.

LEO FRÄNKEL.